United States Patent [19]

Moran et al.

[11] Patent Number: 5,590,119
[45] Date of Patent: Dec. 31, 1996

[54] DETERMINISTIC SELECTION OF AN OPTIMAL RESTORATION ROUTE IN A TELECOMMUNICATIONS NETWORK

[75] Inventors: Carlos W. Moran, Dallas; Louis S. Thibodeaux, Garland, both of Tex.

[73] Assignee: MCI Communications Corporation, Washington, D.C.

[21] Appl. No.: 519,742

[22] Filed: Aug. 28, 1995

[51] Int. Cl.$^6$ .............................. H04L 12/24; H04L 12/56
[52] U.S. Cl. ............................................. 370/225; 370/351
[58] Field of Search ............................... 370/16, 16.1, 60, 370/60.1, 94.1, 94.2, 94.3, 54; 379/221, 273; 340/825.01, 827; 371/11.2

[56] References Cited

U.S. PATENT DOCUMENTS

| | | | |
|---|---|---|---|
| 4,873,517 | 10/1989 | Baratz et al. | 340/827 |
| 5,031,093 | 7/1991 | Hasegawa | 370/16 |
| 5,056,085 | 10/1991 | Vu | 370/60 |
| 5,093,824 | 3/1992 | Coan et al. | 370/16 |
| 5,218,601 | 6/1993 | Chujo et al. | 370/16 |
| 5,495,471 | 2/1996 | Chow et al. | 370/16 |

*Primary Examiner*—Hassan Kizou

[57] ABSTRACT

A deterministic approach further refines the self healing network (SHN) distributed restoration algorithm (DRA) used for restoring traffic disrupted between two adjacent nodes. Upon detection of a fault, the sender node constructs a restoration signal that includes a weighed identifier field. The restoration message is broadcast to tandem nodes each of which had been provisioned with a memory table having stored therein a plurality of weights each associated with a particular spare link connected to the node. Upon detection of an incoming restoration message, a tandem node retrieves from its table the weight associated with the spare link from which the restoration message was received. The weighed identifier is retrieved from the restoration message and updated with the weight that the tandem node had retrieved from its table. The updated weighed identifier is reinserted to the restoration message and the updated restoration message is broadcast to downstream nodes for further propagation to the chooser node. As the restoration message arrives at each succeeding tandem node, the weighed identifier continues to be updated. The chooser node, upon receipt of the restoration message, retrieves the weighed identifier and compares the weighed identifier with other weighed identifiers of other restoration messages received before a restoration time out. Based on this comparison, the chooser node chooses an alternate route with the best weighed identifier.

29 Claims, 11 Drawing Sheets

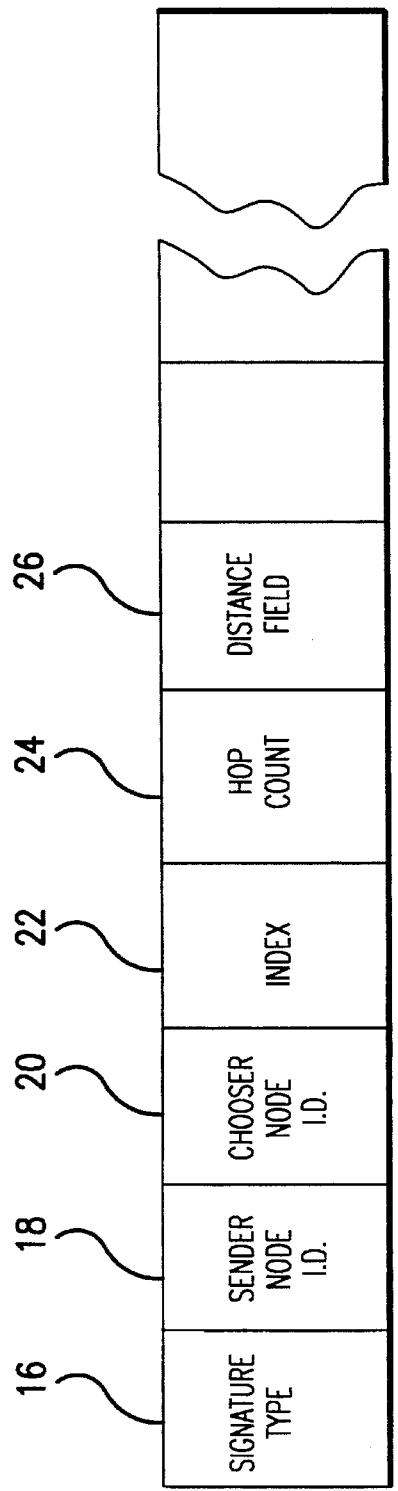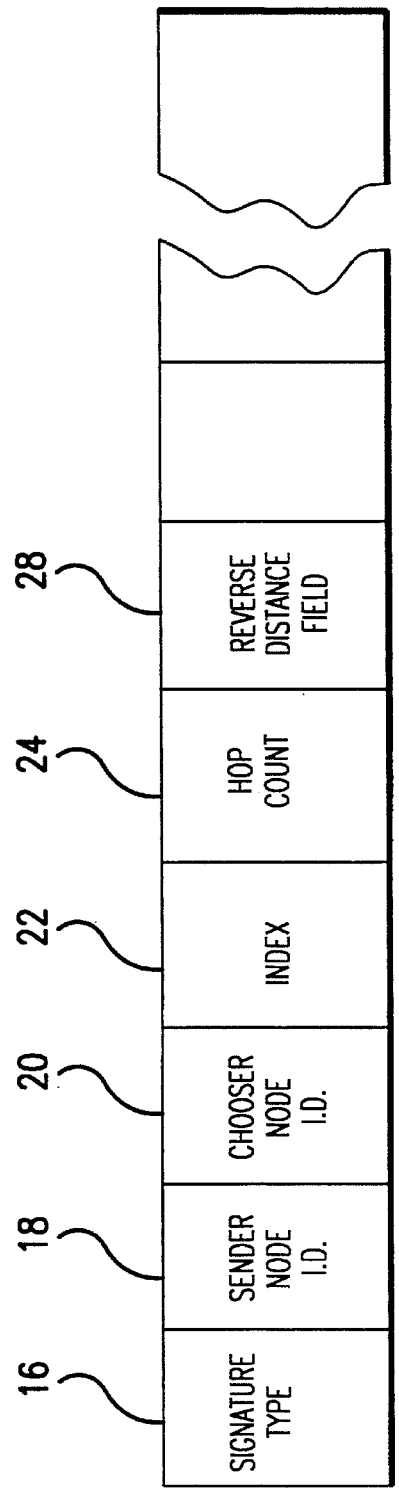

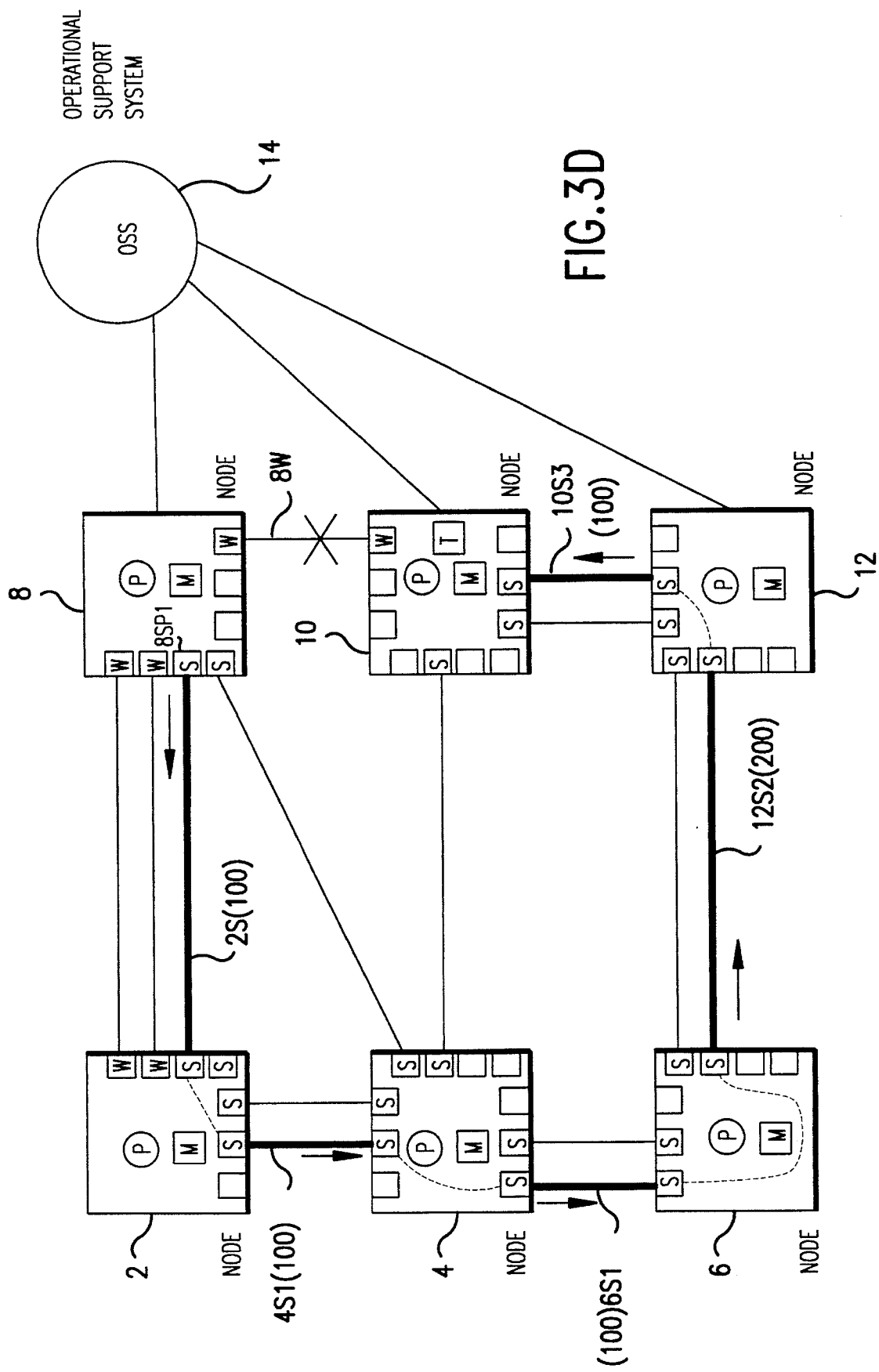

DETERMINISTIC SELECTION OF AN OPTIMAL RESTORATION ROUTE IN A TELECOMMUNICATIONS NETWORK

RELATED APPLICATIONS

This invention relates to the following inventions disclosed in: an application by W. Russ entitled "System and Method for Resolving Substantially Simultaneous Bi-directional Requests of Spare Capacity" filed on Jun. 7, 1995 having Ser. No. 08/483,578; an application by Russ et al. entitled "Automated Path Verification for SHN-Based Restoration" filed on Jun. 7, 1995 having Ser. No. 08/483,525; an application by W. Russ entitled "Automated Restoration of Unrestored Link and Nodal Failures" filed on Jun. 7, 1995 having Ser. No. 08/483,579; an application by Russ et al. entitled "Method and System for Resolving Contention of Spare Capacity Circuits of a Telecommunications Network" filed on Jun. 6, 1995 having Ser. No. 08/468,302; an application by J. Shah entitled "Method and System for Identifying Fault Locations in a Communications Network" filed on Jun. 7, 1995 having Ser. No. 08/481,984; an application by Russ et al. entitled "System and Method Therefor of Estimating Optimal Spare Capacity for a Distributed Restoration Scheme" filed on Jun. 22, 1995 having Ser. No. 08/493,477; an application by Sees et al. entitled "System and Method for Reconfiguring a Telecommunications Network to its Normal State After Repair of Fault" filed on Jun. 22, 1995 having Ser. No. 08/493,741; and an application by Shah et al. entitled "Knowledge Based Path Set Up and Spare Capacity Assignment for Distributed Network Restoration" filed on Jun. 22, 1995 having Ser. No. 08/493,747. The above-noted related applications, whose disclosures are incorporated by reference to this application, are all to be assigned to the same assignee as the instant invention.

FIELD OF THE INVENTION

The present invention relates to a telecommunications network having a plurality of intelligent nodes or switches interconnected by a plurality of spans for effecting a plurality of communications circuits, and more particularly to a method of optimally selecting an alternate route for restoring traffic disrupted between two adjacent nodes. The present invention also relates to a system for effecting the optimal alternate route selection method and the specific protocols of the flooding and reverse linking signatures used for accomplishing the inventive method.

BACKGROUND OF THE INVENTION

Network survivability is of utmost importance in a telecommunications network, since loss of services in the network for only a very short period of time can tremendously affect the operability of the network and cause a significant loss of revenue. The self healing network (SHN) distributed restoration algorithm (DRA) disclosed in U.S. Pat. No. 4,956,835 teaches selecting a K-shortest path for restoring disrupted traffic between adjacent nodes. The '835 method, however, is based on a non-deterministic approach that is subject to the various dynamic delay characteristics present in the network at the particular moment of time that an outage occurs. As a consequence, the '835 method does not guarantee that an optimal restoration path, or alternate route, will be chosen for a given malfunction in the network.

To elaborate, the '835 method theoretically restores traffic in a mesh network by working in parallel in a distributed fashion to select from among the available spare capacity the restoration connections or spare links. Although in theory the '835 distributed method will always select the K-shortest path for restoring the affected traffic, in actuality, this method is affected by the delays encountered by the restoration signatures flooded across all the nodes of the network. This is primarily due to the non-uniform nodal processing delays of the various nodes of the network. In other words, the propagation (or transmission and retransmission) of the restoration signatures (or messages) for both flooding and reverse linking sequences over different alternate routes are limited by the speed in which the various nodes along the various alternate routes detect and process the messages. Putting it differently, the spare capacity provided to a network is based on the assumption that restoration of disrupted traffic will behave according to a shortest path rule. If this shortest path rule is not followed, then restoration may not be possible due to a lack of spare capacity for certain portions of the network. The assumption therefore is that all equipment of the network behave the same uniformly throughout the network. Yet the fact that some devices may take longer than others to process the messages traversing therethrough means that the theoretically shortest path rule, as espoused in the '835 patent, will not always produce a truly optimal restoration route to restore disrupted traffic.

SUMMARY OF THE INVENTION

The present invention effects a deterministic approach to restore disrupted traffic in a distributed network by provisioning in each of the nodes of the network a memory table for storing a plurality of weights each being identified with an input connection to the node. The weights are not time dependent and for the embodiment to be discussed infra, are distance measurements such as for example the respective lengths of the spare links connecting the node to its adjacent nodes. Each spare link connecting a node to one of its adjacent nodes is assigned a weight, i.e. a mileage which is fixed and therefore deterministic. Detectors may be built into the respective ports to which the links are connected so that incoming signals or messages are detected.

When a fault occurs at a working link connecting two adjacent nodes, upon detection of the fault, by convention, one of the nodes is designated a sender node while the other a chooser node. The sender node initiates a restoration process by constructing a flooding signature (or restoration message) to begin the SHN process. For the instant invention, the restoration message is constructed to have an additional field for storing a weighed identifier which is updated by each node that the restoration message reaches. The weighed identifier may be a distance value which is set for example to 0 at the sender node.

As the restoration message is routed to a tandem node, the weighed identifier is retrieved by the processor at the tandem node. The weight stored in the table at the tandem node which corresponds to the spare link from which the restoration message reaches the tandem node is retrieved and summed to the already retrieved weighed identifier. In the case that the weighed identifier is a distance value, the value of the length of the spare link is added to the existing distance value. The incremented distance value is inserted back to the weighed identifier field of the restoration message. The newly weighed restoration message is then propagated to downstream nodes in its search for an alternate route to the chooser node.

This process is repeated each time the restoration message arrives at a tandem node. Thus, assuming that a restoration time-out has not occurred and that the restoration message has a sufficiently large hop count, the restoration message, when finally reaching the chooser node, will contain at its weighed identifier field a weighed identifier whose value is a summation of all sections of the alternate route that the restoration message had traversed. For the case of the weighed identifier being a distance value, such distance value represents the total distance of the alternate route from the sender node to the chooser node. Given that distance is not time dependent, a deterministic approach to find an alternate route is therefore accomplished.

The restoration message containing the optimal weighed identifier is chosen by the chooser node so that the alternate route that that route restoration message had traversed is used to restore the disrupted traffic. In the case that the weighed identifier is a distance value, the restoration message containing the shortest distance value is chosen from among the restoration messages arrived at the chooser node within the predetermined restoration time-out period.

To confirm that the chosen alternate route is indeed the optimal alternate route, a reverse restoration message, or a reverse linking signature, is constructed by the chooser node and transmitted onto the chosen alternate route. This reverse restoration message has a reverse weighed identifier field which may for example be a reverse distance field having a value set at the chooser node to be the summed distance value of the chosen alternate route. When the reverse restoration message arrives at a tandem node, the reverse process take place in which the tandem node retrieves from its store table the weight associated with the spare link from which the reverse message is received. The stored weight is decremented from the value of the weighed identifier so that as successive tandem nodes are traversed by the reversed restoration message, its reverse weighed reverse identifier value is decremented successively. By the time that the reverse restoration message reaches the sender node, the weighed identifier should have the same value as the value of the weighed identifier field of the restoration message that was sent by the sender node. In the case that the weighed identifier field is a distance field, the distance value for the reverse restoration message, upon arrival at the sender node, should be the same as the value of the distance field of the restoration message sent by the sender node, for example 0.

The present invention accordingly provides a deterministic approach that is not affected by the various time or nodal processing delays of the different nodes in a distributed network through which restoration messages traverse in attempting to find alternate routes for restoring disrupted traffic in the network.

BRIEF DESCRIPTION OF THE DRAWINGS

The above-noted and other features, objectives and advantages of the present invention will become more apparent from the following description in which reference is made to an embodiment of the invention taken in conjunction with the appended drawings wherein:

FIG. 2A is an illustration of the structure of a restoration message;

FIG. 2B is an illustration of the structure of a reverse restoration message;

FIGS. 3B–3E each show one of the alternate routes shown in FIG. 3A; and

DESCRIPTION OF THE PREFERRED EMBODIMENT

Figure 1:
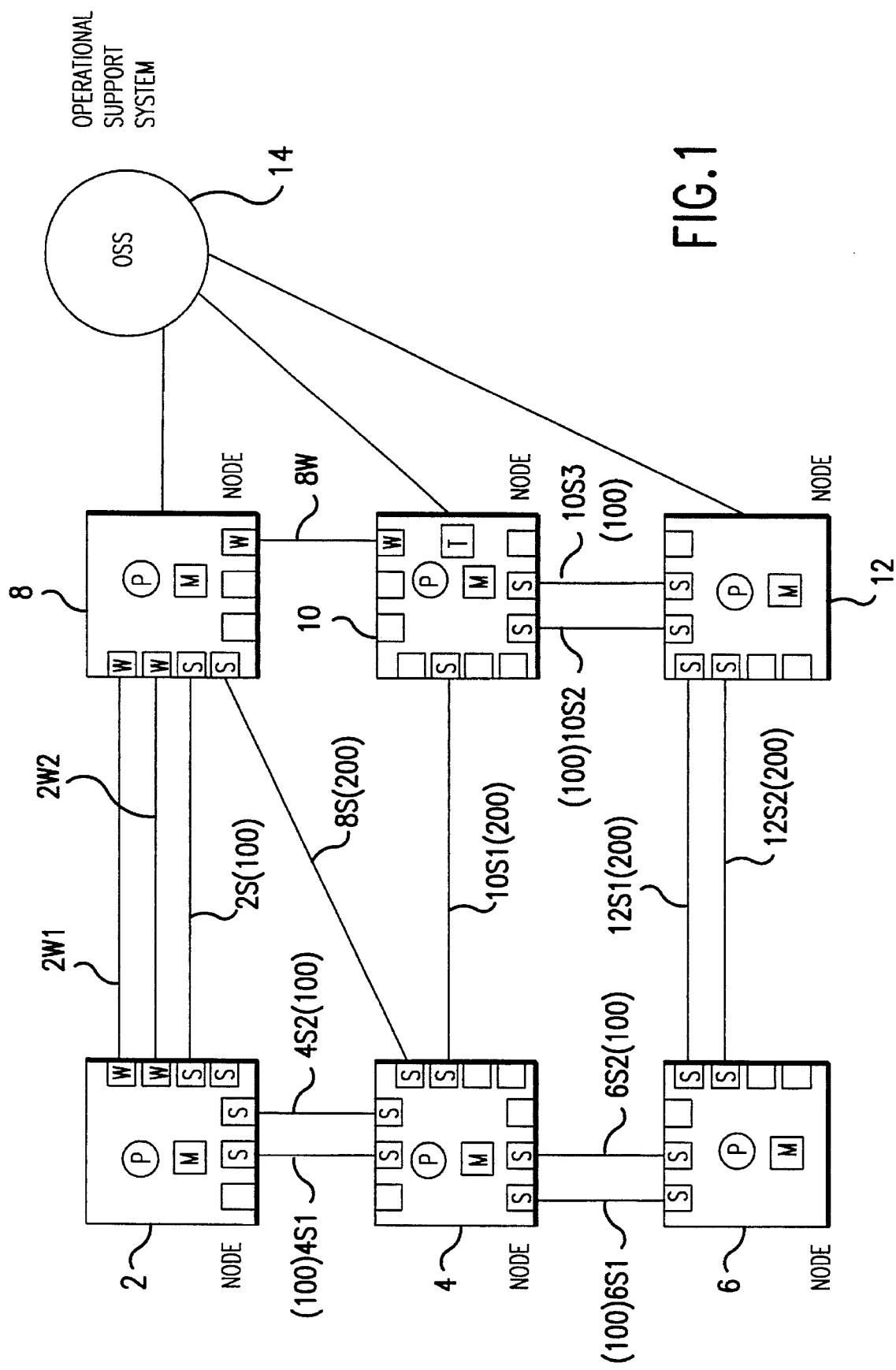
FIG. 1 shows an exemplar portion of a telecommunications network and the interconnections of the various nodes.

An exemplar portion of a telecommunications network for explaining the present invention is illustrated in FIG. 1. As shown, a plurality of intelligent nodes 2, 4, 6, 8, 10 and 12 are interconnected to each other via spans, and more specifically by links. Each of the links could be either an asynchronous digital service level 3 (DS-3) or a synchronous transport signal level (STS-n) or optical carrier signal level (OC-n) connection. For the FIG. 1 embodiment, each of nodes 2–12 is a digital cross-connect switch (DCS) made for example by the Alcatel Network Systems having manufacture model No. 1633-SX. Of course, equivalent or analogous cross-connect switches may also be used.

For ease of explanation, shown within each of nodes 2–12 are a processor P and a memory M, which comprises in addition to other storages, a store table specific to the instant invention. Further provisioned within each of the nodes are a number of ports, identified as W or S, respectively designating working and spare ports. These ports provide input/output connections between each of the nodes and its adjacent nodes. For example, node 2 is shown to have three links, namely 2W1, 2W2 and 2S, connecting it to its adjacent node 8. Links 2W1 and 2W2 are working links each connecting corresponding working ports of nodes 2 and 8. Link 2S is a spare link that connects node 2 to node 8 via corresponding spare ports. Node 2 is further shown to be connected to node 4 by two spare links 4S1 and 4S2.

Similarly, node 4 is shown to be connected to node 6 by two spare links 6S1 and 6S2. Spare links 12S1 and 12S2 connect node 6 to node 12, whereas spare links 10S2 and 10S3 connect node 12 to node 10. There is furthermore shown a spare link 8S connecting node 8 to node 4 and a spare link 10S1 connecting node 10 to node 4. Finally, a working link 8W is shown to connect node 8 to node 10.

For the FIG. 1 embodiment, assume that in addition to the spare links, there are a number of working links interconnecting the various nodes. However, for the sake of simplicity, only one working link 8W connecting node 8 to node 10 and two-working links 2W1 and 2W2 connecting node 2 to node 8 are shown.

As was stated above, each of the nodes has a memory M that comprises a store table. The table has stored therein various weights each corresponding to a spare link that is connected to a particular one of the spare ports of the node. Take node 2 for example. As shown, there are three spare links, namely 2S, 4S1 and 4S2 each connected to a corresponding spare port of node 2. The store table accordingly has three weights each corresponding to one of the spare links. These weights may reflect a particular deterministic characteristic associated with the spare links. An example of such weighed characteristic is a distance value, for example a mileage value as represented by the length of the spare link that separates node 2 from its adjacent nodes. Thus, assuming that node 2 is separated from node 8 by 100 miles, then there is stored in the table of node 2 a distance value of 100 for spare link 2S.

Similarly, there are further stored in the table of node 2 distance values for spare links 4S1 and 4S2 which incidentally have the same value insofar as both spare links connect node 2 to node 4. For the FIG. 1 embodiment, assume that node 2 is separated from node 4 by 100 miles. Accordingly, the table at node 2, for the FIG. 1 embodiment, has three values, each being 100, respectively associated with corresponding spare links. The respective distances of the other spare links for the FIG. 1 embodiment are shown in brackets in FIG. 1.

Also shown in FIG. 1 is an operational support system (OSS) 14 that connects to and oversees the overall operation of the various nodes. For the sake of simplicity, only nodes 8, 10 and 12 are shown to be connected to OSS 14. For the instant invention, note that OSS 14 can provision the store tables in each of the nodes with updated values, in the event that interconnections are changed among the various nodes. Other functions of OSS 14, and its interconnections to the various nodes of the network, may be gleaned from the above referenced co-pending applications.

Also resident in each of the intelligent nodes of the FIG. 1 embodiment, but shown only specifically in node 10, is a timer T. This timer provides a predetermined restoration time period during which a chooser node can receive different flooding signatures, or restoration messages, from a sender node. At the end of the predetermined time period, there is a time-out to prevent the chooser node from receiving additional restoration messages. A more detailed discussion of the timer is provided in the above referenced RIC-95-005 application.

Figure 3A:
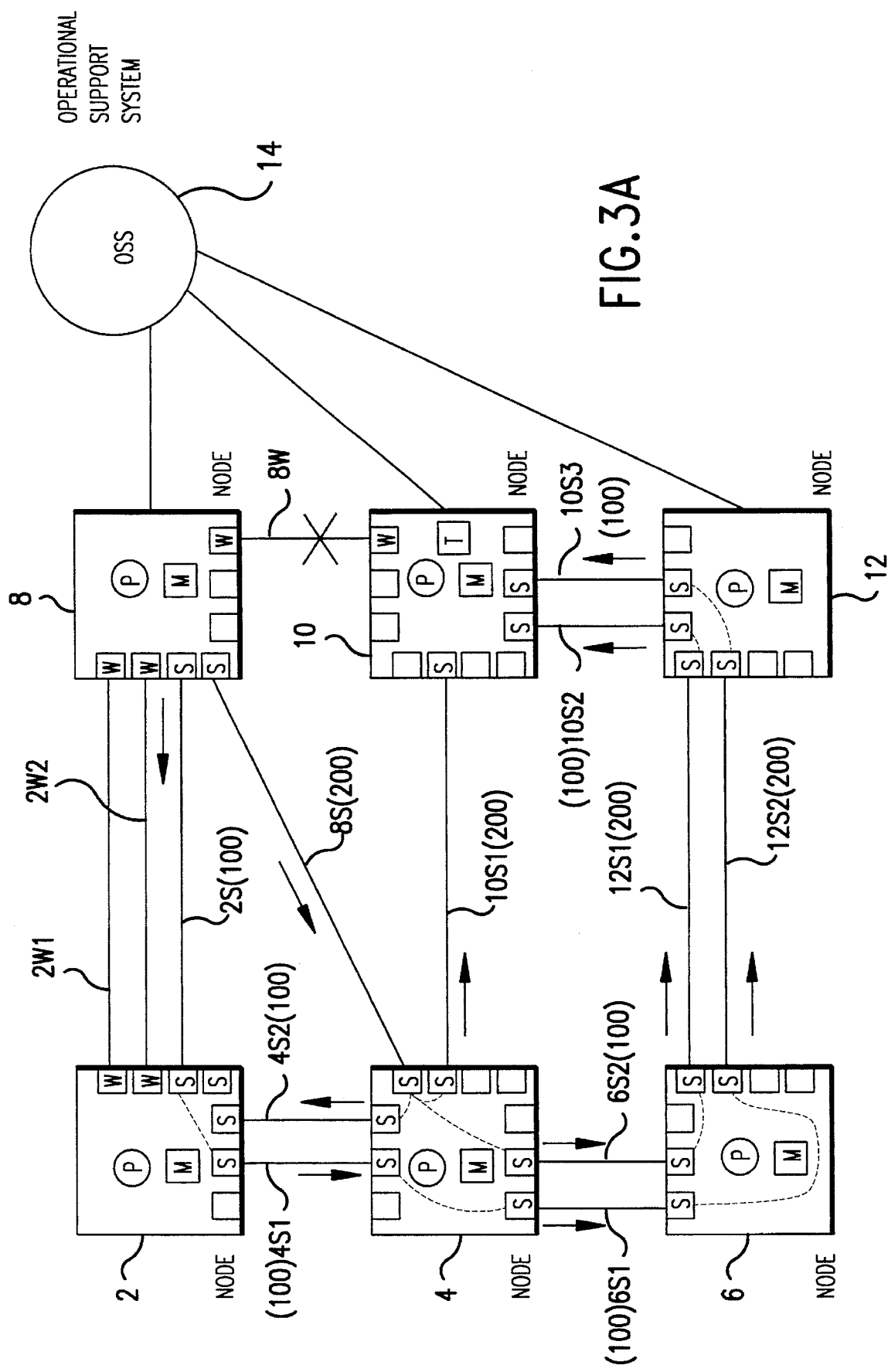
FIG. 3A is the exemplar network shown in FIG. 1 with alternate routes having been found in response to a fault between two adjacent nodes.

When there is a fault at a working link connecting two adjacent nodes, for example a malfunction or a cut of the fiber optic link at 8W shown in FIG. 3A, according to the SHN DRA approach, one of the adjacent nodes sandwiching or bracketing the fault is designated a sender node while the other is designated a chooser node. A flooding signature or a restoration message such as that shown in FIG. 2A is constructed by the sender node and sent out to its adjacent nodes. Each of these intermediate nodes, also known as tandem nodes, upon receipt of the restoration message, will send it further along if it determines that it is not the chooser node to which the message is destined. Such retransmission of the restoration message may be referred to as propagation. Given the proper propagation and provided that there is no restoration time-out, the restoration message will eventually reach the chooser node.

The specific construction of the restoration message, as shown in FIG. 2A, comprises a number of fields. A signature type field 16 provides an identifier for the message, i.e. that it is a restoration message. A sender node I.D. field 18 identifies the sender node. A chooser node I.D. field 20 identifies the chooser node to which the restoration message is destined. An index field 22 for the instant invention embodiment is a unique integer that identifies the port and therefore the spare link from which the sender node sends out the restoration message. The index, along with the sender node and chooser node identifiers, provide an identification of the restoration message to the tandem nodes and the chooser node. Next in the restoration message is a hop count field 24 containing a value that designates the number of nodes to which the restoration message may be sent downstream. For example, a hop count 10 means that the restoration message may be broadcast to 10 downstream nodes, the hop count value of 10 being decremented each time it is received by a downstream node. The last field of importance for the instant invention restoration message is a weighed identifier field, shown to be distance field 26 in FIG. 2A. It is here that a deterministic weighed value such as for example a distance field value is stored. When constructed by the sender node, if a distance field value is indeed used as the weighed identifier, it is set to 0 by the sender node.

Each of the fields of the restoration message of FIG. 2A in actuality has a number of bits. For example, the signature type field 16 may have 4 bits, the sender node identifier field and the chooser node identifier field may each have 8 bits, and the index and the hop count field each may have 15 bits. As for the distance field 26, a sufficiently large number of bits, for example 15, are provisioned therefor in the restoration message so that the value of the longest alternate route possible in the network could be stored thereat.

With reference to FIG. 3A, it can be seen that when a fault is detected, for example at working link 8W, adjacent nodes 8 and 10 will determine between themselves who is to be the sender node and who is to become the chooser node. By conventional SHN practice, the lower number node is designated the sender while the higher number node the chooser. For the FIG. 3A embodiment the sender is therefore node 8 while the chooser is node 10. As shown, a restoration message such as that shown in FIG. 2A is sent from sender 8 to its adjacent node 2 via spare link 2S. Furthermore, since node 8 is also connected to node 4 by an express spare link 8S, a duplicate restoration message is likewise flooded to node 4 from node 8.

The restoration messages from sender 8 are propagated through the various nodes of the network until they reach chooser node 10. In fact, as shown by in FIG. 3A, there are four different alternate routes found by the restoration messages from sender node 8 to chooser node 10. It is assumed for the FIG. 3 embodiment that the timer T at node 10 has been set for a predetermined time period such that a number of restoration messages will be received by chooser node 10 before there is a time-out. Each of the restoration messages received at node 10 in turn represents an alternate route. To determine which of these received alternate routes is to be designated as the optimal route for restoring the disrupted traffic at link 8W, chooser node 10 retrieves from each of the received restoration messages the value from its distance field 26. As will be discussed later, chooser node 10 chooses the restoration message with the lowest distance value since the alternate route traversed by that restoration message is the shortest. An alternate restoration route is thus established based on the data carried by the chosen restoration message which representing the spare links traversed by the restoration message.

Figure 3B:
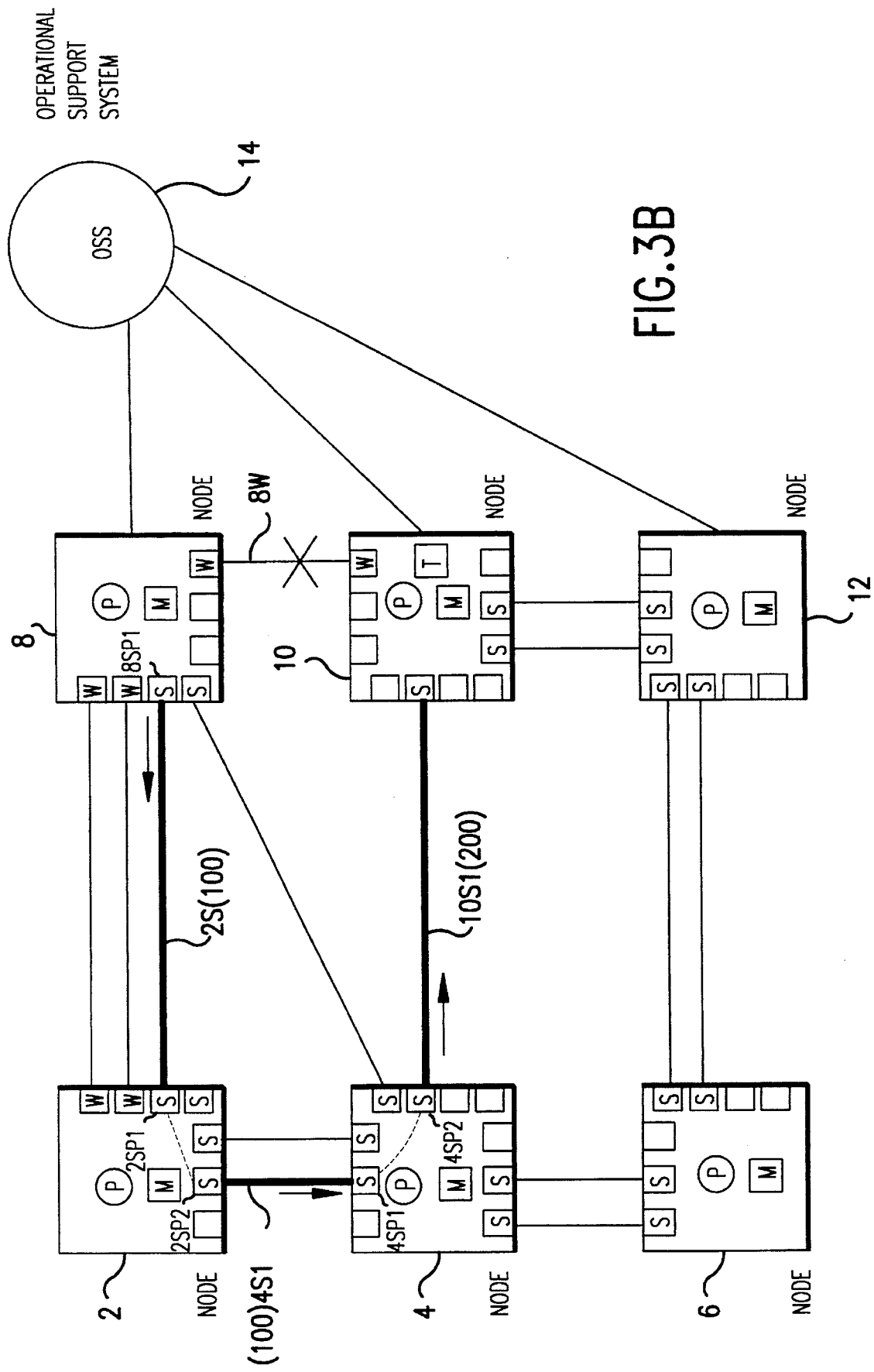

FIGS. 3B–FIG. 3E each show an alternate path traversed by one of the restoration messages. As shown in FIG. 3B, a restoration message is sent by node 8 to node 2 via spare link 2S. Since node 2 has a spare link that connects it to node 4, recognizing that it is not the chooser node, node 2 broadcasts the restoration message via spare link 4S1 to node 4. The restoration message is further broadcast by node 4 to node 10 via spare link 10S1. Chooser node 10, recognizing that the restoration message is destined for it, determines that a first alternate path has been found. The information relating to the first alternate path is carried by the restoration message.

Return to node 2 for further discussion of the instant invention. Upon detection of the arrival of the restoration message by the detector at spare port 2SP1, processor P in node 2 retrieves the value stored in distance field 26 of the restoration message. In addition, processor P references its store table for the distance value associated with spare link 2S, which is connected to spare port 2SP1. Given that the distance value stored in its table is 100 (for spare link 2S), processor P adds that distance value to the already existing value of distance field 26, i.e. 0. The now updated distance field value, i.e. 100, is inserted to distance field 26 and the restoration message is then routed from spare port 2SP1 to 2SP2 and sent on its way to spare link 4S1.

Similarly, when the restoration signal from node 2 arrives at node 4, specifically at spare port 4SP1 for example, it is detected by the detector thereat and reported to processor P of node 4. The value of the distance field 26 of the restoration message is again retrieved and is summed with the distance value stored in the table of node 4 associated with spare link 4S1. The updated distance value 200 (100 +100) is inserted to distance field 26; and the updated restoration message is then routed to spare port 4SP2 and broadcast onto spare link 10S1 so as to be routed to node 10.

At node 10, a distance value of 200 (for spare link 10S1) is retrieved from the store table of node 10 and added to the existing value of distance field 26. The alternate route represented by 8-2-4-10 accordingly has a distance value of 400. This value may indicate for example that the first alternate route is 400 miles.

Figure 3C:
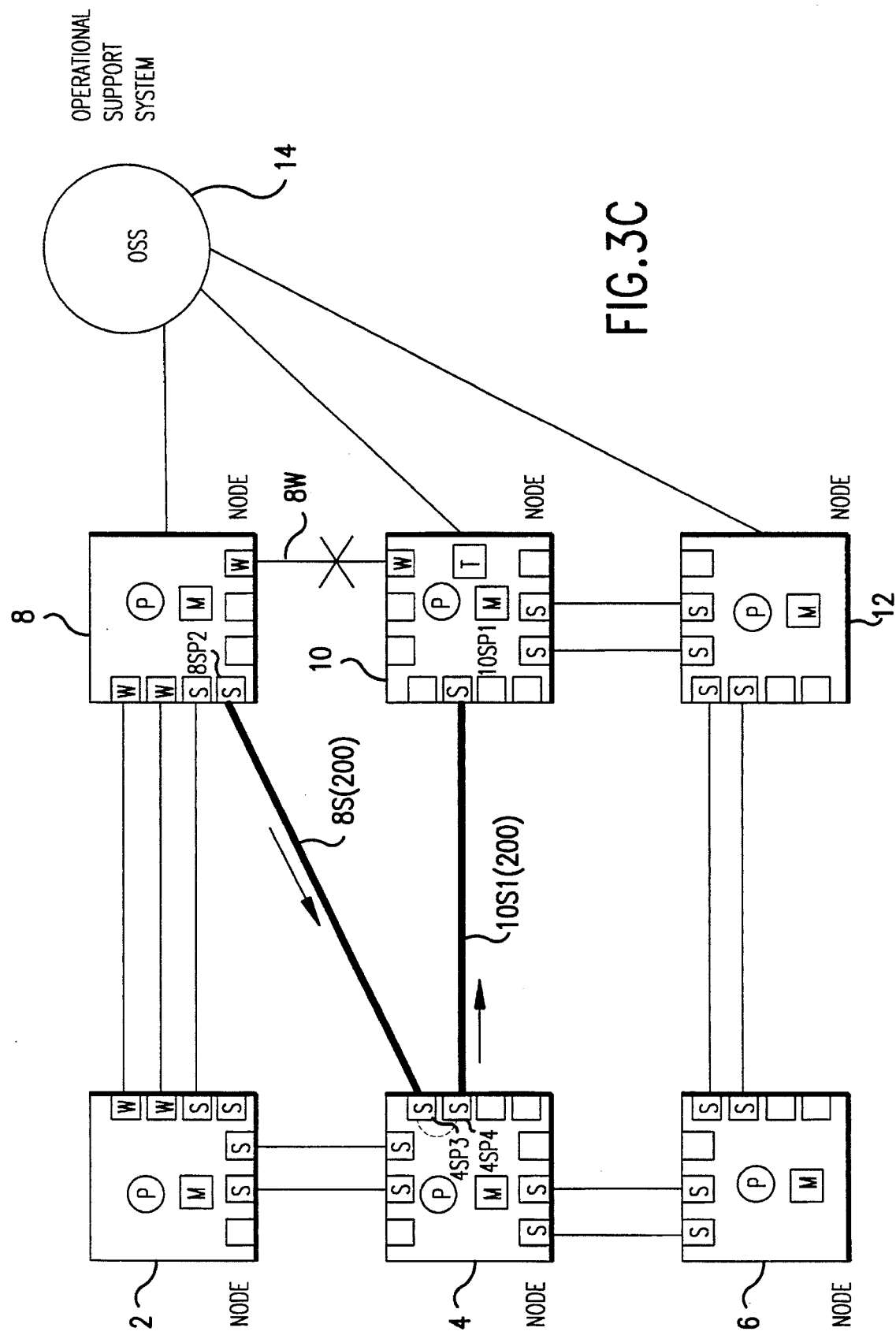

The second alternate route found is shown in FIG. 3C. There the restoration message is sent out by sender 8 onto spare link 8S so as to be received by port 4SP3 of node 4. After updating the distance value from 0 to 200 at node 4, the updated restoration message is broadcast by node 4, via its spare port 4SP4 onto spare link 10S1 toward chooser node 10. At node 10, recognizing that it is the chooser node identified by the restoration message, the distance value of 200 associated with spare link 10S is added to the existing distance value. Accordingly, the alternate route shown in FIG. 3C, similar to the alternate route shown in FIG. 3B, also has a distance value of 400. The alternate route of FIG. 3C may be represented as 8-4-10.

A third alternate route received by chooser node 10 for restoring the traffic disrupted by the fault at working link 8W is shown in FIG. 3D. For this alternate route, the restoration message traveled from node 8 to node 2 to node 4 to node 6 to node 12 and then finally to node 10. Accordingly, this alternate route may be represented as 8-2-4-6-12-10. In terms of the distance value, by adding the distances separating the respective pairs of the adjacent nodes (or the respective links of the corresponding spare links connecting the adjacent nodes), the alternate route of FIG. 3D is found to have a distance value of 600.

Figure 3E:
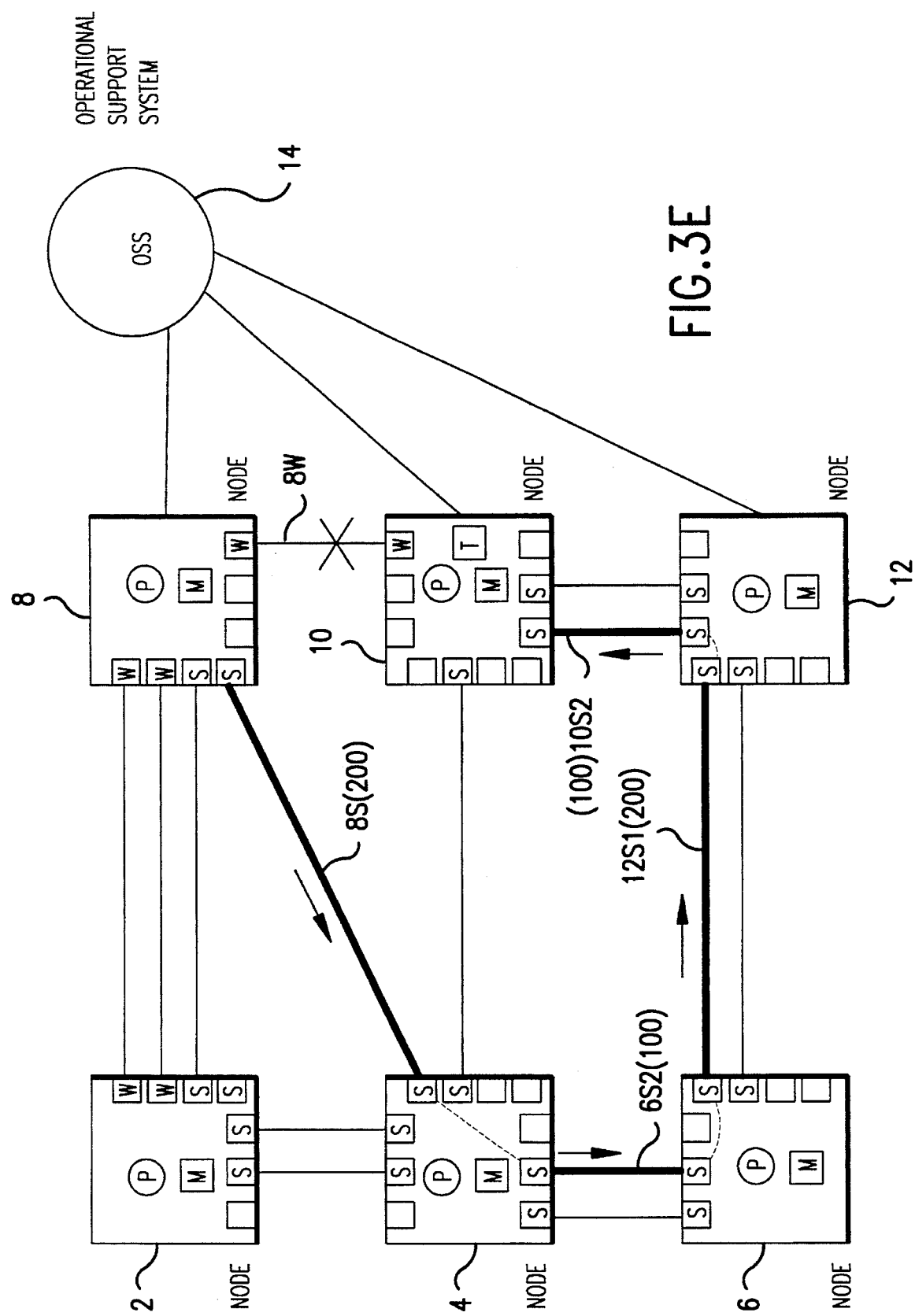
Figure 4A:
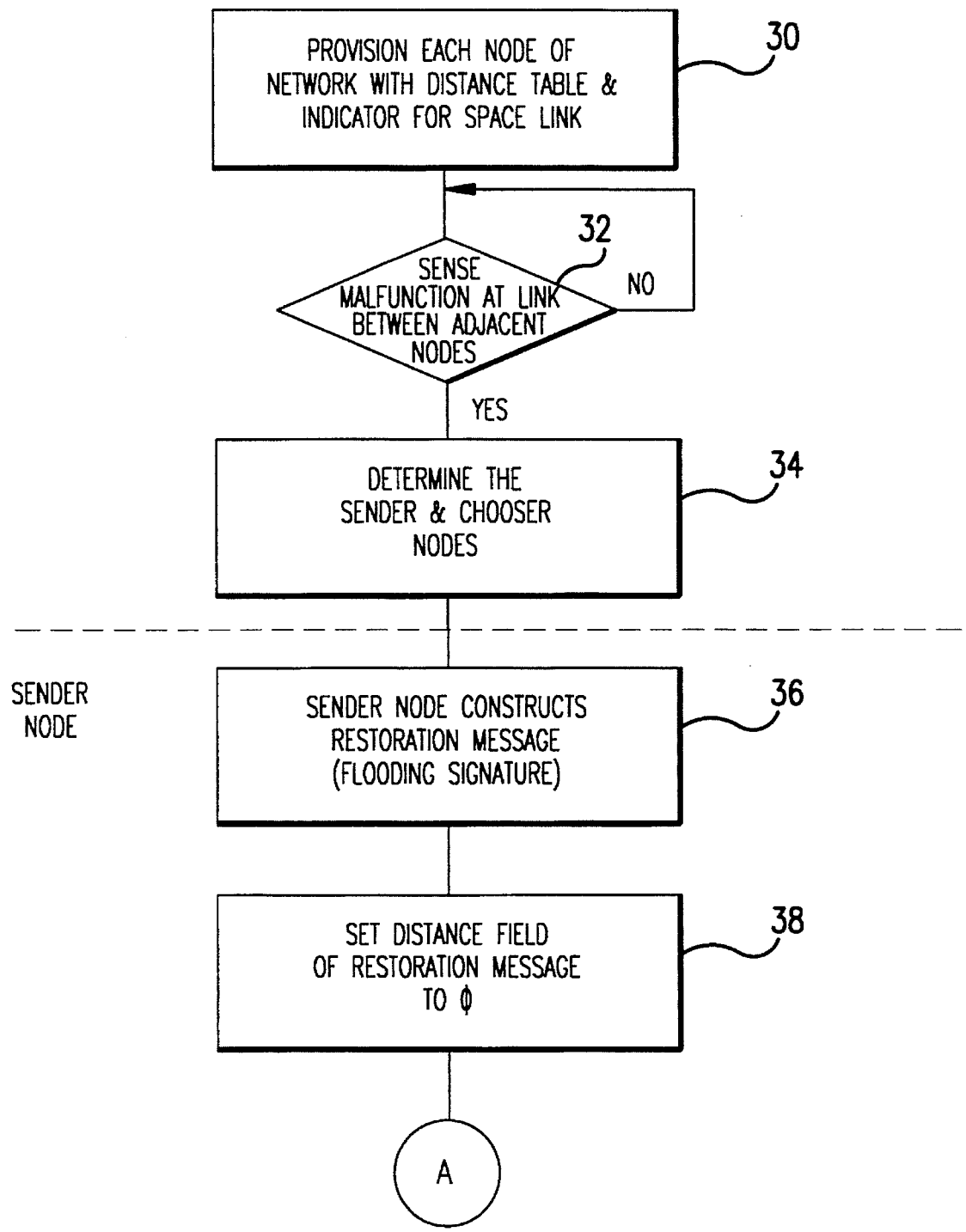
FIGS. 4A–4D, in combination, provide a flow chart illustrating the operation of the instant invention.
Figure 4B:
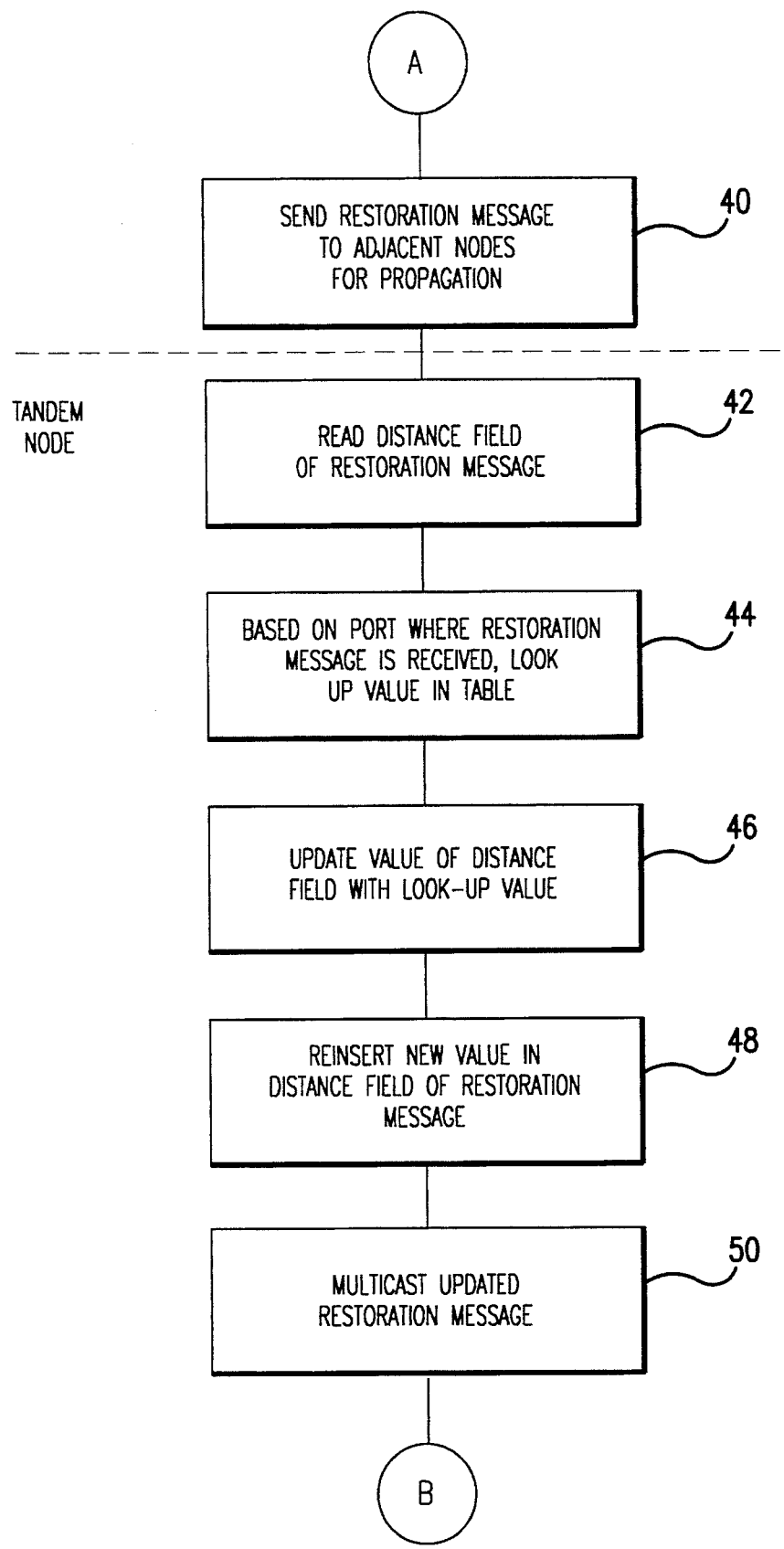
Figure 4C:
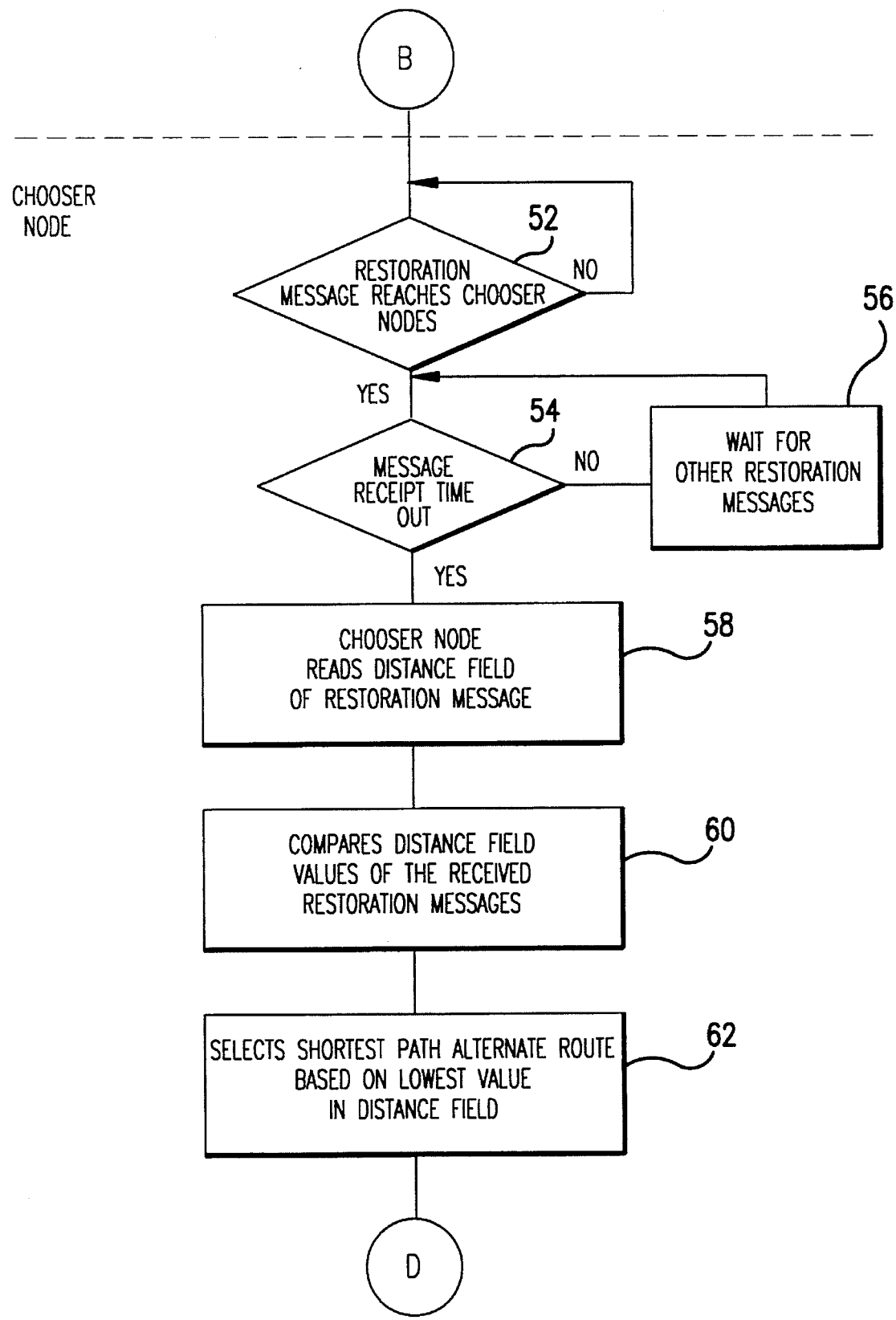
Figure 4D:
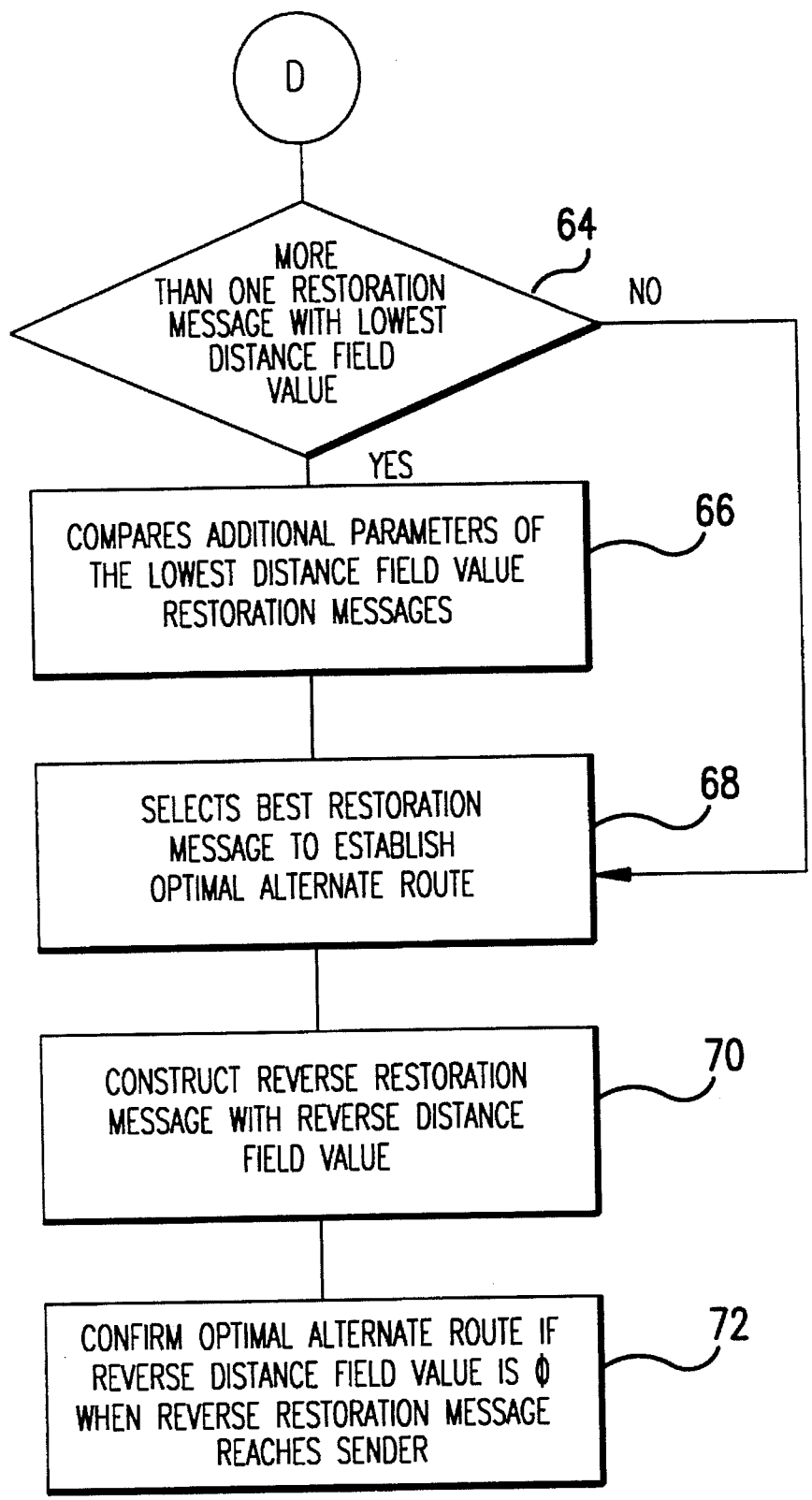

FIG. 3E shows the last alternate route found for restoring traffic disrupted by the fault at working link 8W. This last alternate route is represented by the restoration message having to travel from node 8 to node 4 to node 6 to node 12 and to node 10. The combined distance value of this alternate route 8-4-6-12-10 is 600.

Of the four alternate routes found, as represented by the four restoration messages arriving at chooser node 10, two (8-2-4-6-12-10 of FIG. 3D and 8-4-6-12-10 of FIG. 3E) obviously would not be considered since they each have a distance value of 600. Of the remaining two, namely 8-2-4-10 of FIG. 3D and 8-4-10 of FIG. 3C each of which has a distance value of 400, it is clear that each of those two alternate paths is acceptable. In the event that only one alternate path is found to have the shortest distance, that path of course will be chosen by chooser node 10 to be the alternate route onto which traffic may be restored. However, when there are more than one alternate route found having the same best optimal identifier value or distance value, a further step needs to be taken to determine which of the those alternate routes is the optimal route.

For the present invention, a different attribute of the restoration message may be utilized. One such exemplar attribute of the restoration messages is the hop count, as indicated in field 24. For the alternate routes of FIGS. 3B and 3C, it can be seen that alternate route 8-2-4-10 has a hop count usage of 4 while alternate route 8-4-10 of FIG. 3C has a hop count usage of 3. Accordingly, the optimal alternate route, provided that the value of the distance field for the respective restoration messages are the same, could be determined by examining the number of hops used by each restoration message via its hop count field. For the embodiment shown in FIGS. 3A-3E, therefore, the optimal alternate route chosen by chooser node 10 is alternate route 8-4-10. The thus chosen optimal alternate route not only has the lowest mileage, but also requires the least number of hops between nodes.

To confirm that chosen alternate route 8-4-10 indeed is the optimal route, once having made that decision, chooser node 10 constructs a reverse restoration message, or a reverse linking signature, as shown in FIG. 2B. The reverse restoration message is similar to the restoration message shown in FIG. 2A but for one exception, namely the replacement of the distance field 26 with a reverse distance field 28. In contrast to the value placed by sender node 8 in distance field 26 of the FIG. 2A restoration message, chooser node 10 inserts into reverse distance field 28 of the FIG. 2B reverse restoration message the summed distances value which it had earlier calculated for the incoming restoration message. The reverse restoration message is transmitted to port 10SP1 from which it earlier had received the restoration message, and then broadcast onto spare link 10S to node 4.

Node 4, upon detection of the incoming reverse restoration message which coincidentally is identified in signature type field 16 as a reverse restoration message, retrieves from its store table the distance value associated with spare link 10S1. This associated spare link value is decremented or subtracted from the value retrieved from reverse distance field 28. The remaining reverse distance value, namely 200 (400–200) is inserted into reverse distance field 28; and the updated reverse restoration message is then transmitted via spare port 4SP3 onto spare link 8S to sender node 8.

Sender node 8, upon detection of the incoming restoration message by the detector at spare port 8SP2, retrieves the reverse distance value from the reverse restoration message. The distance value associated with spare link 8S is next retrieved from its store table and subtracted from the retrieved reverse distance value. If a 0 distance value results, sender node 8 confirms that alternate route 8-4-10 indeed is the optimal alternate route to which traffic disrupted between node 8 and node 10 by the fault occurring at working link 8W may be restored.

As was noted previously, the number of restoration messages received by the chooser node may be limited by the predetermined restoration time set by timer T in accordance with the contention problems noted in the above-referenced RIC-95-005 application.

The operation of the instant invention is illustrated with reference to the flow chart embodied in FIGS. 4A–4D.

As represented by block 30, each node of the network is first provisioned with a weight table, for example a distance table with indicators for the various spare links connected to the node. Each of the nodes of the network is also provisioned with detectors at its working ports to sense any malfunction or fault that may occur at the working links connected thereto. In other words, when there is a fault at a working link, the adjacent nodes to which the faulty link is connected each sense the fault at their respective working link ports. This is shown in decision block 32. Each of the nodes stays vigilant in sensing any malfunction. If a malfunction is detected, per block 34, the adjacent nodes bracketing the fault determine between themselves which is to be sender node and which is to be the chooser node.

Upon designation as such, the sender node constructs a restoration message of FIG. 2A per block 36. The value of the distance or weighed identifier field of the restoration message is next set to 0, or any given value in block 38. Thereafter, the sender node floods the restoration message to its adjacent nodes for propagation in block 40.

Upon receipt of a restoration message, each tandem node reads the distance field of the restoration message per block 42. Based on the port from which the restoration message is received, the tandem node looks up the distance value associated with the incoming spare link from its store table in block 44. Once the distance value is retrieved from both the restoration message and its store table, the tandem node updates the value of the distance field with its look-up value, per block 46. In the next step 48, the newly updated distance value is inserted to the distance field of the restoration message. Thereafter, the updated restoration message is multicast to nodes downstream from that tandem node, per block 50.

The chooser node, having detected a fault and been designated as the chooser node, waits for any incoming restoration message per block 52. When a restoration message is received, a determination is made on whether its timer T has timed out at block 54. If it has not, the chooser node will wait for other restoration messages per block 56. If the timer has timed out, the chooser node, per block 58, reads the respective distance fields of the restoration messages. The read distance field value of the last received restoration message is compared with the distance field values of all, if any, of the received restoration messages per block 60. Thereafter, the chooser node selects the restoration message representative of the shortest alternate route, for example based on the lowest value in its distance field, per block 62. If there is but one lowest valued alternate route, then that alternate route becomes the optimal alternate route for restoration. This is represented by decision block 64 and block 68. However, if there are more than one restoration message having the lowest distance field value, at least one additional common parameter (or characteristic) of those lowest distance field valued restoration messages are compared. This is represented in block 66. For the instant embodiment, as was stated earlier, one such additional parameter may be the hop count.

The chooser node next constructs a reverse restoration message with a reverse distance field value per block 70. This reverse restoration message is sent along the selected alternate route toward the sender node. When the reverse restoration message reaches the sender node, the sender node will confirm that the alternate route selected by the chooser is indeed the optimal alternate route if the reverse distance field value is 0. This is represented per block 72.

While a preferred embodiment of the present invention is disclosed herein for purposes of explanation, numerous changes, modifications, variations, substitutions and equivalents, in whole or in part, should now be apparent to those skilled in the art to which the invention pertains. Accordingly, it is intended that the invention be limited only by the spirit and scope of the appended claims.

I claim:

1. In a telecommunications network having a plurality of nodes interconnected by a plurality of working links and spare links, a method of ascertaining an optimal alternate route between first and second adjacent nodes for restoring traffic disrupted therebetween, comprising the steps of:

(a) provisioning a table in each of the nodes of said network to store respective weights each corresponding to a spare link connecting said each node and an adjacent other node;

(b) sending restoration messages from said first node to said second node via various spare links connecting the various nodes of said network to find alternate routes for restoring traffic between said first and second nodes, each restoration message including a field for storing a weighed identifier representative of the various spare links connecting the various nodes through which said each restoration message traverses;

(c) using the appropriate weight provided in the table in each of the various nodes through which said each restoration message traverses to reweigh the identifier stored in said field of said each restoration message as said each restoration message traverses from said first node to said second node via the various spare links and the various nodes; and (d) choosing from among the restoration messages received at said second node the restoration message with the best weighed identifier for establishing said optimal alternate route to restore the traffic disrupted between said first and second nodes.

2. The method of claim 1, wherein said step (a) further comprises the step of equating the weight of a corresponding spare link with the distance separating said each node and the adjacent other node connected to said each node by said corresponding spare link; and wherein the identifier stored in said field of said each restoration message is reweighed by adding the distance separating said each node and said adjacent other node to any distance already stored in said field;

said method further comprising the step of:

broadcasting said each restoration message with said reweighed distance to nodes downstream thereof to find alternate routes to said second node.

3. The method of claim 2, further comprising the step of:

establishing the size of said field to have sufficient bits to store the identifier representative of the optimal alternate route distance.

4. The method of claim 1, further comprising the steps of:

establishing a predetermined time period during which restoration messages from said first node are to be received by said second node; and proceeding with said step (d) at the termination of said predetermined time period.

5. The method of claim 1, further comprising the step of:

adding another field to said each restoration message for storing a weighed attribute to be used by said second node to decide if the alternate route traversed by said each restoration message is to be the optimal alternate route if said second node receives more than one restoration message having the same best weighed identifier.

6. The method of claim 1, further comprising the step of:

sending a reverse restoration message from said second node to said first node via said optimal alternate route, said reverse restoration message including another field having a reverse identifier representative of the various spare links connecting the various nodes from said first node to said second node for establishing said optimal alternate route, said reverse identifier being changed by an amount associated with each spare link of said optimal alternate route said reverse restoration message traverses over so that successive amounts of said reverse identifier are changed in said another field as said reverse restoration message is routed across and through successive spare links and nodes, respectively, from said second node to said first node.

7. The method of claim 6, further comprising the step of:

confirming said optimal alternate route to be the route for rerouting the traffic disrupted between said first and second nodes when the reverse identifier of said reverse restoration message, upon reaching said first node, is the same as the identifier of the restoration message, before it was sent out by said first node, chosen by said second node to establish said optimal alternate route.

8. In a telecommunications network having a plurality of nodes interconnected by a plurality of working links and spare links, a fault having occurred between two adjacent nodes to disrupt traffic traversing therebetween, a method of finding an optimal alternate route to reroute the disrupted traffic between said adjacent nodes, comprising the steps of:

(a) designating one of said adjacent nodes a sender and the other of said adjacent nodes a chooser;

(b) storing in a memory in each of the nodes of said network the respective distances separating said each node and other nodes connected thereto by corresponding spare links;

(c) sending restoration messages from said sender to said chooser via various spare links connecting various nodes of said network to find at least one alternate route for restoring the disrupted traffic between said sender and said chooser, each of said restoration messages including a distance field having a given value at said sender;

(d) updating the value of the distance field for said each restoration message with the stored distance corresponding to the spare link from which said each restoration message arrives in each of said traversed nodes as said each restoration message traverses from node to node via the various spare links toward said chooser; and (e) choosing from among the restoration messages received at said chooser the restoration message with the lowest updated distance value in its distance field for establishing said optimal alternate route between said sender and said chooser.

9. The method of claim 8, further comprising the steps of:

establishing a predetermined time period during which restoration messages from said sender are to be received by said chooser; and proceeding with said step (e) at the termination of said predetermined time period.

10. The method of claim 8, further comparing the step of:

adding another field to said each restoration message for storing an attribute to be used by said chooser to choose the restoration message to establish said optimal alternate route if said chooser receives more than one restoration message having the same lowest updated distance.

11. The method of claim 10, wherein said attribute is a hop count, said method further comprising the step of:

choosing the restoration message having the lowest hop count from among the restoration messages received by said chooser to establish said optimal alternate route.

12. The method of claim 8, further comprising the step of:

sending a reverse restoration message from said chooser to said sender via said optimal alternate route, said reverse restoration message including another field having a reverse distance value representative of the combined distances of the various spare links connecting the various nodes from said sender to said chooser for establishing said optimal alternate route, said reverse distance value being subtracted by an amount corresponding to the distance of the spare link of said optimal alternate route traversed over by said reverse restoration message as said reverse restoration message traverses along said optimal alternate route so that successive spare link distances are subtracted from said reverse distance value as said reverse restoration message is routed across and through successive spare links and nodes, respectively, of said optimal alternate route.

13. The method of claim 12, further comprising the step of:

confirming said optimal alternate route to be the route for rerouting the traffic disrupted between said sender and said chooser if the reverse distance value of said reverse restoration message, when said reverse restoration message reaches said sender, is the same as the given value in the distance field of the restoration message, before it was sent out by said sender, chosen by said chooser to establish said optimal alternate route.

14. A telecommunications network comprising:

a plurality of nodes interconnected by a plurality of working links and spare links;

a table provisioned in each of the nodes of said network to store respective weights each corresponding to a spare link connecting said each node to an adjacent other node;

a first node provisioned to send restoration messages to a second node via various spare links connecting various nodes of said network to find alternate routes for restoring traffic flowing between said first and second nodes via a working link when a fault occurred at said working link, each restoration message including a field for storing a weighed identifier representative of the various spare links connecting the various nodes through which said each restoration message traverses, the appropriate weight provided in the table in each of the various nodes through which said each restoration message traverses being used to reweigh said weighed identifier as said each restoration message traverses from said first node to said second node; and said second node provisioned to choose from among the restoration messages received thereat the restoration message with the best weighed identifier for establishing an optimal alternate route to reroute the traffic disrupted between said first and second nodes due to said fault.

15. The network of claim 14, wherein the weight of a corresponding spare link is equated with the distance separating said each node and the adjacent other node connected to said each node by said corresponding spare link;

wherein the identifier stored in said field of said each restoration message is reweighed by adding the distance separating said each node and said adjacent other node to any distance already stored in said field of said each restoration message; and wherein said each restoration message with said added distance to nodes is broadcasted downstream to find alternate routes to said second node.

16. The network of claim 15, wherein the size of said field comprises sufficient bits to store the identifier representative of the optimal alternate route distance.

17. The network of claim 14, further comprising:

timer means for establishing a predetermined time period during which restoration messages from said first node are to be received by said second node, said second node proceeding with choosing from among the restoration messages received thereat the restoration message with the best weighed identifier for establishing said optimal alternate route at the termination of said predetermined time period.

18. The network of claim 14, wherein said each restoration message further comprises another field for storing a weighed attribute to be used by said second node to decide if the alternate route traversed by said each restoration message is to be the optimal alternate route if said second node receives more than one restoration message having the same best weighed identifier.

19. The network of claim 14, wherein said second node is provisioned to send a reverse restoration message to said first node via said optimal alternate route, said reverse restoration message including another field having a reverse identifier representative of the various spare links connecting the various nodes from said first node to said second node for establishing said optimal alternate route, said reverse identifier being changed by an amount associated with each spare link of said optimal alternate route so that successive amounts of said reverse identifier are changed in said another field as said reverse restoration message is routed across and through successive spare links and nodes, respectively, from said second node to said first node, said optimal alternate route being confirmed to be the route for rerouting the traffic disrupted between said first and second nodes if the reverse identifier of said reverse restoration message, when said reverse restoration message reaches said first node, is the same as the identifier of the restoration message, before it was sent out by said first node, chosen by said second node to establish said optimal alternate route.

20. The network of claim 14, wherein said identifiers in said table of each of the nodes of the network are respectively provided with corresponding distances separating said each node from all adjacent nodes to which said each node is at least connected by one or more spare links.

21. In a telecommunications network having a plurality of nodes interconnected by a plurality of working links and spare links, a fault having occurred between two adjacent nodes to disrupt traffic traversing therebetween, a system for finding an optimal alternate route to reroute the disrupted traffic between said adjacent nodes, comprising:

processing means provisioned in each of said nodes of said network, one of said adjacent nodes being designated a sender and the other of said adjacent nodes a chooser;

a memory provisioned in each of the nodes of said network for storing the respective distance values separating said each node and other nodes connected thereto by corresponding spare links; and restoration messages being sent from said sender to said chooser via various spare links connecting various nodes of said network to find at least one alternate route for restoring the disrupted traffic between said sender and said chooser, each of said restoration messages including a distance field having a given value at said sender, the value of the distance field for said each restoration message being updated with the stored distance corresponding to the spare link from which said each restoration message arrives in each of said traversed nodes as said each restoration message traverses from node to node via the various spare links;

said chooser choosing from among the restoration messages received thereat the restoration message with the lowest updated distance value in its distance field for establishing said optimal alternate route between said sender and said chooser.

22. The system of claim 21, further comprising:

timer means for establishing a predetermined time period during which restoration messages from said sender are to be received by said chooser, said chooser proceeding with choosing from among the restoration messages received thereat the restoration message with the lowest updated distance in its distance field at the termination of said predetermined time period.

23. The system of claim 21, wherein said each restoration message further comprises another field for storing an attribute to be used by said sender to choose the restoration message to establish said optimal alternate route if said sender receives more than one restoration message having the same lowest updated distance value.

24. The system of claim 23, wherein said attribute is a hop count, and wherein said chooser chooses the restoration message having the lowest hop count from among the restoration messages having the same lowest updated distance value to establish said optimal alternate route.

25. The system of claim 21, further comprising:

a reverse restoration message being sent from said chooser to said sender via said optimal alternate route, said reverse restoration message including another field having a reverse distance value representative of the combined distances of the various spare links connecting the various nodes from said sender to said chooser for establishing said optimal alternate route, said reverse distance value being subtracted by an amount corresponding to the distance of the spare link of said optimal alternate route traversed by said reverse restoration message as said reverse restoration traverses along said optimal alternate route so that successive spare link distance amounts are subtracted from said reverse distance value as said reverse restoration message is routed across and through successive spare links and nodes, respectively, of said optimal alternate route, said optimal alternate route being confirmed to be the route for rerouting the traffic disrupted between said sender and said chooser if the reverse distance value of said reverse restoration message, when said reverse restoration message reaches said sender, is the same as the given distance of the restoration message, before it was sent out by said sender, chosen by said chooser to establish said optimal alternate route.

26. In a telecommunications network having a plurality of nodes interconnected by a plurality of working links and spare links, a fault having occurred at the working link connecting two adjacent nodes so that traffic traversing therebetween is disrupted, one of said adjacent nodes being designated a sender and the other of said adjacent nodes a chooser, a memory provisioned in each of the nodes of said network for storing respective distance values separating said each node and other nodes connected thereto by corresponding spare links, a method comprising the steps of:

sending a restoration message by said sender to its adjacent nodes; and if necessary, propagating said restoration message by said adjacent nodes to various nodes of said network for further propagation until said restoration message reaches said chooser for finding an optimal alternate route to reroute the disrupted traffic between said sender and said chooser; wherein said restoration message comprises a sender identifier for identifying said sender;

a chooser identifier for identifying said chooser;

an index for identifying the faulty working link; and a restoration message distance value preset to a given value at said sender, said distance value being updated as said restoration message traverses from node to node via the various spare links as each of the nodes, upon receipt of said restoration message, retrieves from its memory the stored distance value corresponding to the spare link from which said restoration message arrives and adds said retrieved stored distance value to the existing restoration message distance value, said restoration message distance value continues to be updated until said restoration message reaches said chooser.

27. The method of claim 26, further comprising the step of:

designating the nodes of said network which are neither said sender nor said chooser tandem nodes;

wherein said restoration message further comprises a hop count whose value is decremented by one each time said restoration message traverses to a tandem node as it traverses toward said chooser.

28. The method of claim 27, further comprising the step of:

assigning each of said sender identifier, chooser identifier, index, restoration message distance value and hop count in said restoration message to a corresponding field each comprising a plurality of bits, the respective sizes of each corresponding field being different, the field containing said restoration message distance value being sufficient large to accommodate the maximum distance value of any alternate route.

29. In a telecommunications network having a plurality of nodes interconnected by a plurality of working links and spare links, a fault having occurred at the working link connecting two adjacent nodes so that traffic traversing therebetween is disrupted, a memory provisioned in each of the nodes of said network for storing respective distance values separating said each node and other nodes connected thereto by corresponding spare links, a method comprising the steps of:

designating one of said adjacent nodes a sender and the other of said adjacent nodes a chooser;

sending a reverse restoration message by said chooser to its adjacent nodes;

if necessary, propagating said reverse restoration message by said adjacent nodes to various nodes of said network for further propagation until said reverse restoration message reaches said sender for confirming an alternate route found by a restoration message from said sender to reroute the disrupted traffic between said sender and said chooser is the optimal alternate route; wherein said reverse restoration message comprises a sender identifier for identifying said sender;

a chooser identifier for identifying said chooser;

an index for identifying the faulty working link; and a reverse distance value having the combined distance values of all spare links connecting the nodes along said alternate route traversed by said restoration message from said sender to said chooser, said reverse distance value being decremented as said reverse restoration message traverses from node to node via the various spare links of said alternate route as each of the nodes, upon receipt of said reverse restoration message, retrieves from its memory the stored distance value corresponding to the spare link from which said reverse restoration message arrives and decrements said retrieved stored distance value from the existing reverse distance value, said reverse distance value continues to be decremented until said restoration message reaches said sender; and confirming the alternate route traversed by said reverse restoration message to be said optimal alternate route if the reverse distance value of said reverse restoration message, when said reverse restoration message reaches said sender, is 0.

* * * * *